(12) United States Patent
Schneider

(10) Patent No.: US 7,945,049 B2
(45) Date of Patent: May 17, 2011

(54) STREAM CIPHER USING MULTIPLICATION OVER A FINITE FIELD OF EVEN CHARACTERISTIC

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 551 days.

(21) Appl. No.: 12/074,012

(22) Filed: Feb. 28, 2008

(65) Prior Publication Data

US 2009/0220083 A1 Sep. 3, 2009

(51) Int. Cl.
*H04L 9/00* (2006.01)
(52) U.S. Cl. .......................................... 380/265; 710/52
(58) Field of Classification Search .................. 380/265; 710/52
See application file for complete search history.

(56) References Cited

U.S. PATENT DOCUMENTS

| | | | |
|---|---|---|---|
| 4,157,454 A | 6/1979 | Becker | |
| 5,003,597 A * | 3/1991 | Merkle | 380/37 |
| 5,214,703 A | 5/1993 | Massey et al. | |
| 5,724,428 A | 3/1998 | Rivest | |
| 5,799,088 A | 8/1998 | Raike | |
| 6,061,449 A | 5/2000 | Candelore et al. | |
| 6,247,112 B1 | 6/2001 | Seki | |
| 6,523,114 B1 * | 2/2003 | Barton | 713/176 |
| 6,560,338 B1 * | 5/2003 | Rose et al. | 380/47 |
| 6,999,588 B1 | 2/2006 | Oishi | |
| 7,103,181 B2 | 9/2006 | Ananth | |
| 7,795,899 B1 | 9/2010 | Grohoski et al. | |
| 2001/0029608 A1 | 10/2001 | Nagashima et al. | |
| 2001/0033656 A1 | 10/2001 | Gligor et al. | |
| 2002/0054679 A1 | 5/2002 | Vesely | |
| 2002/0136406 A1 | 9/2002 | Fitzhardinge et al. | |
| 2003/0048728 A1 | 3/2003 | Kuribayashi et al. | |
| 2003/0059040 A1 | 3/2003 | Rose et al. | |
| 2003/0217268 A1 | 11/2003 | Gantman | |
| 2005/0177727 A1 * | 8/2005 | Moskowitz et al. | 713/176 |
| 2006/0126843 A1 | 6/2006 | Brickell et al. | |
| 2007/0076890 A1 | 4/2007 | Muresan et al. | |
| 2007/0237327 A1 | 10/2007 | Taylor et al. | |
| 2008/0069342 A1 | 3/2008 | Relyea | |
| 2008/0109501 A1 | 5/2008 | Douguet et al. | |
| 2008/0130876 A1 | 6/2008 | Etienne et al. | |
| 2008/0292096 A1 | 11/2008 | Schneider | |
| 2008/0298583 A1 | 12/2008 | Ahmed | |
| 2009/0060179 A1 | 3/2009 | Schneider | |
| 2009/0060180 A1 | 3/2009 | Schneider | |
| 2009/0195370 A1 | 8/2009 | Huffman et al. | |

(Continued)

OTHER PUBLICATIONS

Rose. "A Stream Cipher Based on Linear Feedback over GF($2̂ 8$)". 1998, Springer-Verlag Berlin Heidelberg, C.Boyd and E.Dawson: ACISP'98, LNCSI1438, pp. 135-145.*

(Continued)

*Primary Examiner* — Nasser Moazzami
*Assistant Examiner* — Lisa Lewis
(74) *Attorney, Agent, or Firm* — Blakely, Sokoloff, Taylor & Zafman, LLP

(57) ABSTRACT

A first bit sequence is generated using a first pseudorandom bit source. A second bit sequence is generated using a second pseudorandom bit source. A third bit sequence is generated by multiplying the first bit sequence with the second bit sequence over a finite field of even characteristic, modulo a fixed primitive polynomial. A message is received. The third bit sequence is commingled with the message to conceal contents of the message.

22 Claims, 8 Drawing Sheets

U.S. PATENT DOCUMENTS

2009/0214024 A1  8/2009  Schneider
2009/0292752 A1  11/2009 Schneider
2010/0135486 A1  6/2010  Schneider

OTHER PUBLICATIONS

Tan. "The PLFG parallel pseudorandom number generator" Feb. 2002 pp. 693-698. Future generation computer systems vol. 18 issue 5.*
Federal Information Processing Standards Publication 46-2 "Data Encryption Standard (DES)" Dec. 30, 1993, 16 pages. http://www.itl.nist.gov/fipspubs/fip46-2.htm.
Mirza, Fauzan "Block Ciphers and Cryptanalysis", Mar. 1998, pp. 1-27.
Shannon, C. E, "Communication Theory of Secrecy Systems", *Bell System Technical Journal*, vol. 28 (4), 1949, pp. 656-715.
Red Hat Notice of Allowance for U.S. Appl. No. 11/807,261 mailed Dec. 14, 2010.
Applied Cryptography, 2nd Edition, Chapter 17, pp. 417-418.
"Blum Blum Shub" from Wikipedia, the free encyclopedia, http://en.wikipedia.org/wiki/Blum_Blum_Shub. Aug. 9, 2007, 2 pages.
"Finite Field" from Wikipedia, the free encyclopedia. http://en.wikipedia.org/wiki/Galois_field, Aug. 10, 2007, 5 pages.
"Secure Cryptoprocessor" from Wikipedia, the free encyclopedia. http://en.wikipedia.org/wiki/Secure_cryptoprocessor. Aug. 10, 2007, 3 pages.
Wolfram Math World, Primitive Polynomials, http://mathworld.wolfram.com/primitivepolynomial.html, pp. 1-2, Feb. 9, 2006 from Internet Archive WayBack Machine.
Red Hat Office Action for U.S. Appl. No. 11/897,411 mailed Sep. 2, 2010.
Red Hat Office Action for U.S. Appl. No. 11/897,414 mailed Sep. 2, 2010.
Barker, William C., "Recommendation for the Triple Data Encryption Algorithm (TDEA) Block Cipher", National Institute of Standards and Technology, Technology Administration U.S. Department of Commerce, Information Security, NIST Special Publication 800-67, Version 1.1, Revised May 19, 2008, (May 2004), 40 pages.
Bauer, Friedrich L., "8. Transposition Ciphers", Decrypted Secrets, 2nd edition, (2000), 16 pages.
Belal, Ahmed A., et al., "2D-Encryption Mode" Mar. 2001, 32 pages.
Bellare, M., et al., "A Conventional Authenticated-Encryption Mode" Submission to National Institute of Standards and Technology, Apr. 13, 2003, 14 page.
Bellare, M., et al., "The FFX Mode of Operation for Format-Preserving Encryption" Feb. 20, 2010, pages.
Black, John, et al., "A Suggestion for handling Arbitrary-Length Messages with the CBC MAC", Aug. 2001, 3 pages.
Brier, Eric, et al., "BPS: a Format-Preserving Encryption Proposal" 11 pages, Ingenico, France. Published at the following website Apr. 2010, http://csrc.nist.gov/groups/ST/toolkit/BCM/modes development.html.
Cohen, Bram, "AES-hash" May 2, 2001, 4 pages.
"Data Encryption Standard (DES)", U.S. Department of Commerce/ National Institute of Standards and Technology, FIPS PUB 46-3, Reaffirmed Oct. 25, 1999, 26 pages.
Dworkin, Morris, "Recommendation for Block Cipher Modes of Operation—Galois/Counter Mode (GCM) and GMAC" National Institute of Standards and Technology, Technology Administration U.S. Department of Commerce, Information Security, NIST Special Publication 800-38D, Nov. 2007, 39 pages.
Dworkin, Morris, "Recommendation for Block Cipher Modes of Operation—Methods and Techniques" National Institute of Standards and Technology, Technology Administration U.S. Department of Commerce, Information Security, NIST Special Publication 800-38A, 2001, 66 pages.
Dworkin, Morris, "Recommendation for Block Cipher Modes of Operation—The CCM Mode for Authentication and Confidentiality" National Institute of Standards and Technology, Technology Administration U.S. Department of Commerce, Information Security, NIST Special Publication 800-38C, May 2004, updated 2007, 27 pages.
Dworkin, Morris, "Recommendation for Block Cipher Modes of Operation—the CMAC Mode for Authentication" National Institute of Standards and Technology, Technology Administration U.S. Department of Commerce, Information Security, NIST Special Publication 800-38B, May 2005, 25 pages.
Dworkin, Morris, "Recommendation for Block Cipher Modes of Operation—the XTS-AES Mode for Confidentiality on Storage Devices" National Institute of Standards and Technology, Technology Administration U.S. Department of Commerce, Information Security, NIST Special Publication 800-38E, Jan. 2010, 12 pages.
Fischer, Viktor, "Realization of the Round 2 AES Candidates Using Altera FPGA", (2000), pp. 1-15.
Gligor, Virgil D., et al., "Fast Encryption and Authentication: XCBC Encryption and EXCB Authentication Modes" Mar. 30, 2001 (Apr. 20, 2001, revision), 64 pages, retrieved from http://csrc.nist.gov/groups/ST/toolkit/BCM/modes_development.html.
Gligor, Virgil D., et al., "On Message Integrity in Symmetric Encryption" Nov. 10, 2000, 41 pages. VDG Inc., Maryland.
Håstad, Johan, et al., "Key Feedback Mode: a Keystream Generator with Provable Security" Oct. 11, 2000, 23 pages, Stockholm, Sweden.
Hellstrom, Henrick, "Propagating Cipher Feedback mode" 2001, 4 pages.
Housely, Russ, et al., "Counter with CBC-MAC (CCM)—AES Mode of Operation" RSA Laboratories, Submission to National Institute of Standards and Technology, Jun. 3, 2002, 9 pages.
Iwata, Tetsu, et al., "OMAC: One-Key CBC MAC" Dec. 20, 2002, 32 pages.
Jaulmes, Antoine Joux, et al., "On the Security of Randomized CBC-MAC Beyond the Birthday Paradox Limit A New Construction" 2002, 15 pages, DCSSI Crypto Lab.
Jutla, Charanjit S., "Encryption Modes with Almost Free Message Integrity" IBM T.J. Watson Research Center, New York, 2001, 6 pages.
Jutla, Charanjit S., "Parallelizable Encryption Mode with Almost Free Message Integrity" IBM T.J. Watson Research Center, 2000, 23 pages.
Knudsen, Lars R., "Reports in Informatics—Block Chaining modes of operation" Oct. 2000, 16 pages, Report No. 207, Department of Informatics, University of Bergen, Bergen, Norway.
Kohno, Tadayoshi, et al., "The CWC Authenticated Encryption (Associated Data) Mode" May 27, 2003, 18 pages, Submission to National Institute of Standards and Technology.
Kurosawa, Kaoru, et al., "TMAC: Two-Key CBC MAC" Jun. 21, 2002, 18 pages.
Lipmaa, Helger, et al., "Comments to NIST concerning AES Modes of Operations: CTR-Mode Encryption" 2000, 4 pages.
Mattsson, Ulf T., "Format-Controlling Encryption using Datatype-Preserving Encryption" Jun. 30, 2009, 46 pages, Protegrity Corporation.
McGrew, David A., et al., The Galois/Counter Mode of Operation (GCM) Submission to National Institute of Standards and Technology, May 31, 2005, 44 pages.
Rogaway, Phillip, "PMAC—Proposal to NIST for a parallelizable message authentication code" Apr. 1, 2001, 27 pages.
Rogaway, Phillip, et al., "OCB: A Block-Cipher mode of operation for Efficient Authenticated Encryption" Aug. 3, 2001, 36 pages.
Rogaway, Phillip, et al., "The SIV Mode of Operation for Deterministic Authenticated-Encryption (Key Wrap) and Misuse-Resistant Nonce-Based Authenticated-Encryption" Aug. 20, 2007, 3 pages, retrieved from http://csrc.nist.gov/groups/ST/toolkit/BCM/modes_development.html.
RSA, "What is Cipher Block Chaining Mode?" Mar. 3, 2007 from Internet Archive WayBack machine. http://web.archive.org/web/20070303121357/http://www.rsa.com/rsalabs/node.asp?id=2171.
Schroeppel, Richard C., et al., "Cipher-State (CS) Mode of Operation for AES" Sandia National Laboratories, Submission to National Institute of Standards and Technology, May 7, 2004, 8 pages.
Schneier, "Applied Cryptography", John Wiley and Sons, 2nd Edition, (1996), p. 319.
"Transposition cipher", Wikipedia, the free encyclopedia, http://en.wikipedia.org/wiki/Transposition_cipher, accessed May 8, 2007, 8 pages.

Red Hat Office Action for U.S. Appl. No. 11/807,261 mailed Jul. 19, 2010.
Red Hat Office Action for U.S. Appl. No. 12/072,069 mailed Sep. 2, 2010.
Red Hat Office Action for U.S. Appl. No. 12/325,228 mailed Sep. 3, 2010.

* cited by examiner

STREAM CIPHER USING MULTIPLICATION OVER A FINITE FIELD OF EVEN CHARACTERISTIC

TECHNICAL FIELD

Embodiments of the present invention relate to data encryption, and more specifically to data encryption with a stream cipher that uses multiplication over a finite field of even characteristic.

BACKGROUND

Encryption is a process of transforming information (referred to as plaintext) into an unreadable form (referred to as ciphertext). Decryption is a transformation that recovers the plaintext from the ciphertext. A cipher performs a transformation that is controlled using a symmetric key (same key used for ciphering and deciphering) or an asymmetric key (different keys used for ciphering and deciphering) such that when the key is input to the cipher along with plaintext, the plaintext is enciphered via an encryption transformation, and when the key is input to the cipher along with ciphertext, the ciphertext is deciphered via a decryption transformation (which is an inverse of the encryption transformation). Encryption transformations are performed by an encryption algorithm (function) of a cipher, and decryption transformations are performed by a decryption algorithm (function) of the cipher.

Encryption is used to protect military and civilian systems, examples of which include internet e-commerce, mobile telephone networks, bank automatic teller machines, etc. As technology and computing power advance, new vulnerabilities are commonly discovered for encryption mechanisms that were previously considered secure. When such weaknesses are discovered, new encryption mechanisms and techniques are required to maintain security of sensitive information.

FIG. 1 illustrates a conventional encryption system 100. In the conventional encryption system 100, a message source 105 generates a message that includes plaintext data and sends it to encipherer 115. Encipherer 115 also receives a key from a key source 110. Encipherer 115 uses the key to encrypt the plaintext data into ciphertext, and then transmits the ciphertext to a decipherer 120 over a potentially unsecure channel. Decipherer 120 also receives the key from the key source 110 via a secure channel. Decipherer 120 decrypts the ciphertext using the key to re-create the plaintext data, and then transmits the plaintext data to a destination 130. The transmission of the ciphertext between the encipherer 115 and a decipherer 120 is exposed to the risk that a cryptanalyst 125 will intercept the ciphertext and attempt to decrypt it to re-create the plaintext. Therefore, it is important that the encipherer 115 and decipherer 120 use an encryption scheme that is resistant to decryption attacks.

BRIEF DESCRIPTION OF THE DRAWINGS

The present invention is illustrated by way of example, and not by way of limitation, in the figures of the accompanying drawings and in which.

DETAILED DESCRIPTION

Figure 1:
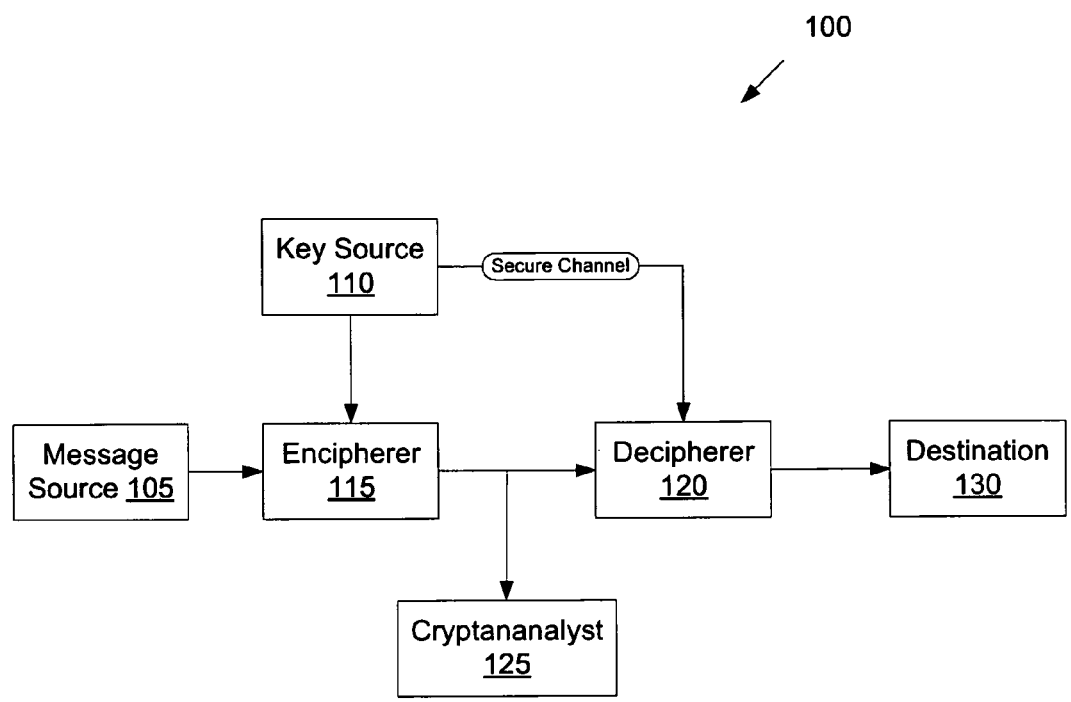
FIG. 1 illustrates a conventional encryption system.

Described herein is a method and apparatus for encrypting and decrypting data. In one embodiment, a first bit sequence is generated using a first pseudorandom bit source. The first pseudorandom bit source include a first linear feedback shift register that has a first feedback function defined by a first primitive polynomial. A second bit sequence is generated using a second pseudorandom bit source. The second pseudorandom bit source include a linear feedback shift register that has a second feedback function defined by a second primitive polynomial. The first linear feedback shift register and second linear feedback shift register may each be initialized before generating bit sequences. A third bit sequence is generated by multiplying the first bit sequence with the second bit sequence over a finite field of even characteristic, modulo a fixed primitive polynomial. In one embodiment, the degree of the first primitive polynomial and the degree of the second primitive polynomial are pair wise coprime. In another embodiment, the fixed primitive polynomial has a degree that is less than or equal to the first primitive polynomial and the second primitive polynomial. A message is received. The third bit sequence is commingled with the message to conceal contents of the message.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating", "forwarding", "receiving", "performing", "encrypting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Finite field arithmetic will now be discussed in more detail. A finite field (also known as a Galois Field) is a field that contains only finitely many elements. A finite field can be represented mathematically as $GF(p^m)$, where p is a prime number called the "characteristic" and m is an integer greater than or equal to 1 called the "dimension" of the field. Each finite field has an "order" in the form of $p^m$, which represents the number of elements within the finite field. There exists a unique finite field of the order $p^m$ for every prime number p and integer m>1, up to isomorphism. Any two finite fields with the same number of elements are isomorphic.

Arithmetic in a finite field is different than standard integer arithmetic. Using finite field arithmetic, all operations performed in the finite field result in an element of the finite field. For example, in a finite field of GF(2) the only elements of the field are 0 and 1, and thus 1+1=0. Elements of a finite field $GF(p^m)$ may be represented as polynomials of degree strictly less than m over GF(p). Mathematical operations (e.g., addition, multiplication, etc.) can be performed modulo Y, where Y is a primitive polynomial of degree m over GF(p). A primitive polynomial is a minimal polynomial of a primitive element of the extension field $GF(p^m)$.

In some embodiments of the invention, finite fields of $GF(2^m)$ are used for the purposes of cryptography. In such finite fields, in which the prime (p) is of even characteristic (2), polynomials can be represented as binary strings (sequences). For example, the polynomial $x^6+x^4+x+1$ can be represented as the binary string (sequence) 1010011. In finite fields with characteristic 2, addition and subtraction are identical, and can be accomplished using the exclusive OR (XOR) operator. The symbol $\oplus$ represents addition within a finite field. Multiplication for such finite fields is polynomial multiplication modulo a primitive polynomial of degree m over GF(2). The symbol $\oplus$ represents multiplication within a finite field.

Figure 2A:
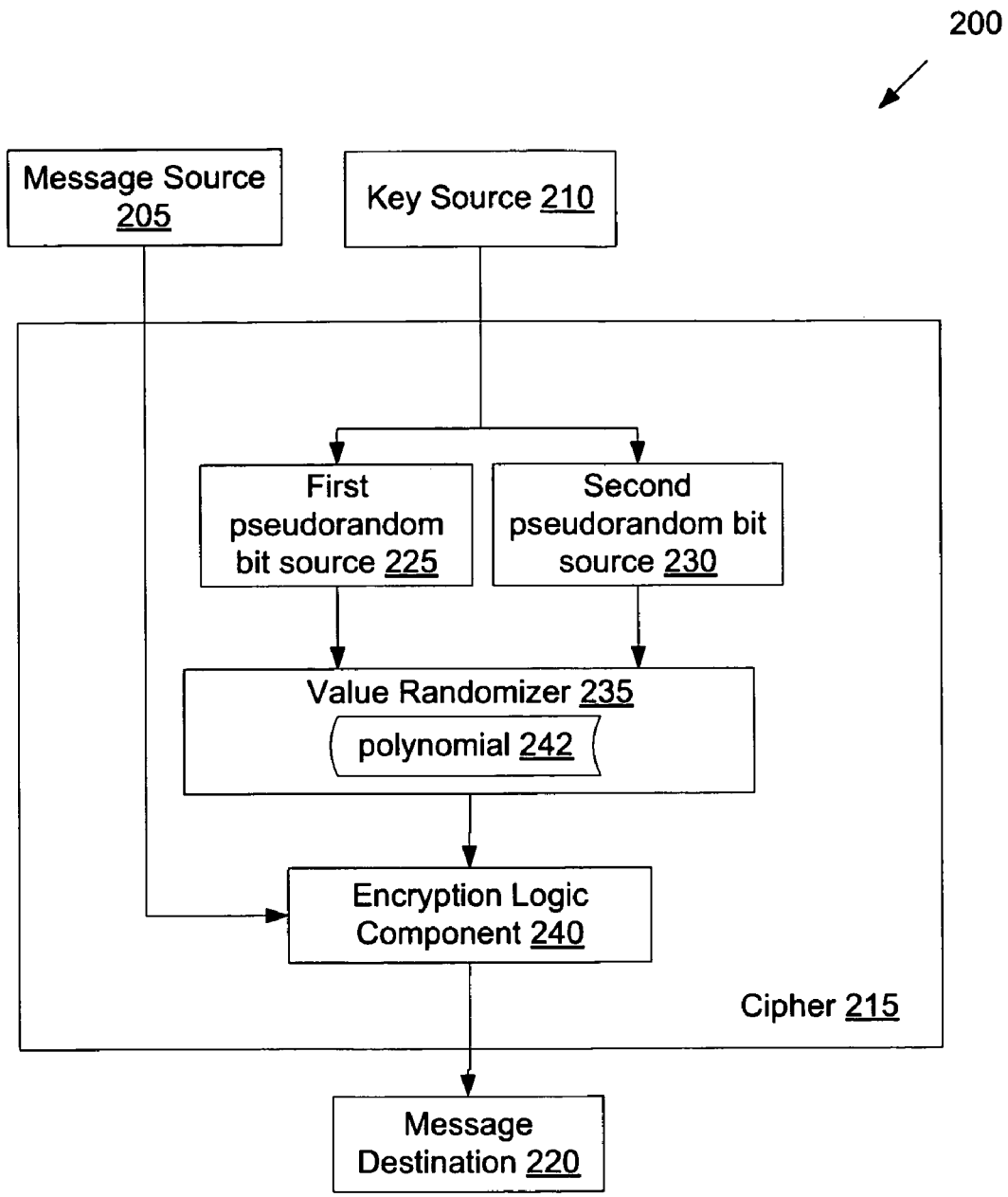
FIG. 2A illustrates an encryption system, in accordance with one embodiment of the present invention.

FIG. 2A illustrates an encryption system 200, in accordance with one embodiment of the present invention. The encryption system 200 may include a message source 205, a key source 210, a cipher 215 and a message destination 220. Message source 205 may be an input device, an application (e.g., a mail application), a file system or database, a region of memory, or some other source. Message source 205 can transmit or otherwise provide plain text data or cipher text data to cipher 215 for encryption or decryption, respectively. The cipher 215 enciphers (encrypts) or deciphers (decrypts) such data before sending the data on to a message destination 220.

In one embodiment, message source 205 generates application level messages that are encrypted by cipher 215 before they are transmitted over a network to message destination 220. Such application level messages may include messages of distributed transactions, messages of secure applications, messages associated with a service oriented architecture (SOA), messages associated with an enterprise service bus (ESB), etc. Another cipher (not shown) may intercept and decrypt the messages before they are received by the message destination 220. In another embodiment, message source 205 is an electronic mail application and the messages include electronic mail messages that are encrypted by cipher 215 before transmission to a remote message destination 220. Such messages may then be decrypted by another cipher (not shown) after they are received by message destination 220. In yet another embodiment, message source 205 includes a disk drive, flash drive, or other memory device (e.g., RAM, optical drive, etc.) that has information stored thereon, and the message destination 220 includes that same memory device or some other memory device. Cipher 215 may encrypt some or all of the data stored on the memory device for secure storage, and decrypt the stored data when it is needed.

In one embodiment, cipher 215 is a hardware device (e.g., a specialized encryption device). In another embodiment, cipher 215 is a component of a computing device. Alternatively, cipher 215 may include software that is part of an operating system, an application, or a combination thereof. Cipher 215 may also include a combination of software and hardware.

To encipher or decipher the received data, cipher 215 receives a secret key from a key source 210. In one embodiment, the key source 210 is a key generator that can receive an input from a user, and use that input to generate a key or multiple keys. Alternatively, the key source 210 may be a memory or other storage location that stores keys. For example, the key source 210 may be a universal serial bus (USB) key token, a protected region of memory used to store keys, etc.

In one embodiment, cipher 215 includes a stream cipher. Stream ciphers are symmetric ciphers that combine plaintext with a pseudorandom cipher bit stream (called a keystream) to generate ciphertext (e.g., via an exclusive OR (XOR) operation) and combine ciphertext with the pseudorandom bit stream to recreate the plaintext. In stream ciphers data is enciphered or deciphered one bit or byte at a time, and the transformation of successive bits or bytes varies depending on the current state of the cipher. A stream cipher can operate on any size of data in a bitwise fashion.

Stream ciphers are divided into synchronous stream ciphers and self-synchronizing stream ciphers. In a synchronous stream cipher the keystream is generated independently of the plaintext and ciphertext messages. In a self-synchronizing stream cipher ciphertext bits are used in computing the keystream. Examples of stream ciphers include Rivest Cipher, number 4 (RC4), A5/1, Fibonacci Shrinking (FISH), Phelix, MUGI, etc.

In another embodiment, cipher 215 includes a block cipher. Block ciphers are substitution ciphers that operate on fixed-length groups of bits known as blocks. Where data to be encrypted is longer than a block, the data is divided into multiple blocks, and each block is separately encrypted. Block ciphers have an encryption and a decryption algorithm that may be different or the same, each of which accepts an input block and a key, and produces an output block. Examples of block ciphers include twofish, blowfish, serpent, data encryption standard (DES), advanced encryption standard (AES), CAST5, international data encryption algorithm (IDEA), etc.

For a block cipher to be made secure, it may be used in a mode of operation, which may encrypt different blocks in different ways. Thereby, even if two different blocks include the same plaintext, the corresponding ciphertext will be different for the two blocks. Examples of modes of operation include electronic codebook (EBC), cipher-block chaining (CBC), propagation cipher-block chaining (PCBC), cipher feedback (CFB), output feedback (OFB), etc.

In yet another embodiment, cipher 215 may include both a block cipher and a stream cipher. For example, a block cipher in a cipher-feedback mode of operation is also a self-synchronizing stream cipher. In another example, cipher 215 may include a stream cipher that provides a keystream that can be used as a key by a block cipher included in cipher 215 to encrypt data.

In one embodiment, cipher 215 includes a first pseudorandom bit source 225, a second pseudorandom bit source 230 and a value randomizer 235. Alternatively, cipher 215 may include more than two pseudorandom bit sources. These pseudorandom bit sources can be used to generate pseudorandom values, which can be combined by the value randomizer 235. In one embodiment, the first pseudorandom bit source 225 includes a first linear feedback shift register (LFSR) and the second pseudorandom bit source includes a second linear feedback shift register (LFSR). Alternatively, one or both of the first pseudorandom bit source 225 and the second pseudorandom bit source 230 may include a multiply with carry feedback generator, a lagged Fibonacci generator, a Mersenne Twister and/or a feedback with carry shift register. The first pseudorandom bit source 225 and second pseudorandom bit source 230 may also include, for example, any stream cipher used as a bit source (e.g., RC4, FISH, Mugi, etc.), any block cipher (e.g., DES, AES, etc.) running in a streaming output mode or a counter mode, or some other pseudorandom value generator. The first pseudorandom bit source 225 and the second pseudorandom bit source 230 may include the same or different pseudorandom value generators.

Figure 2B:
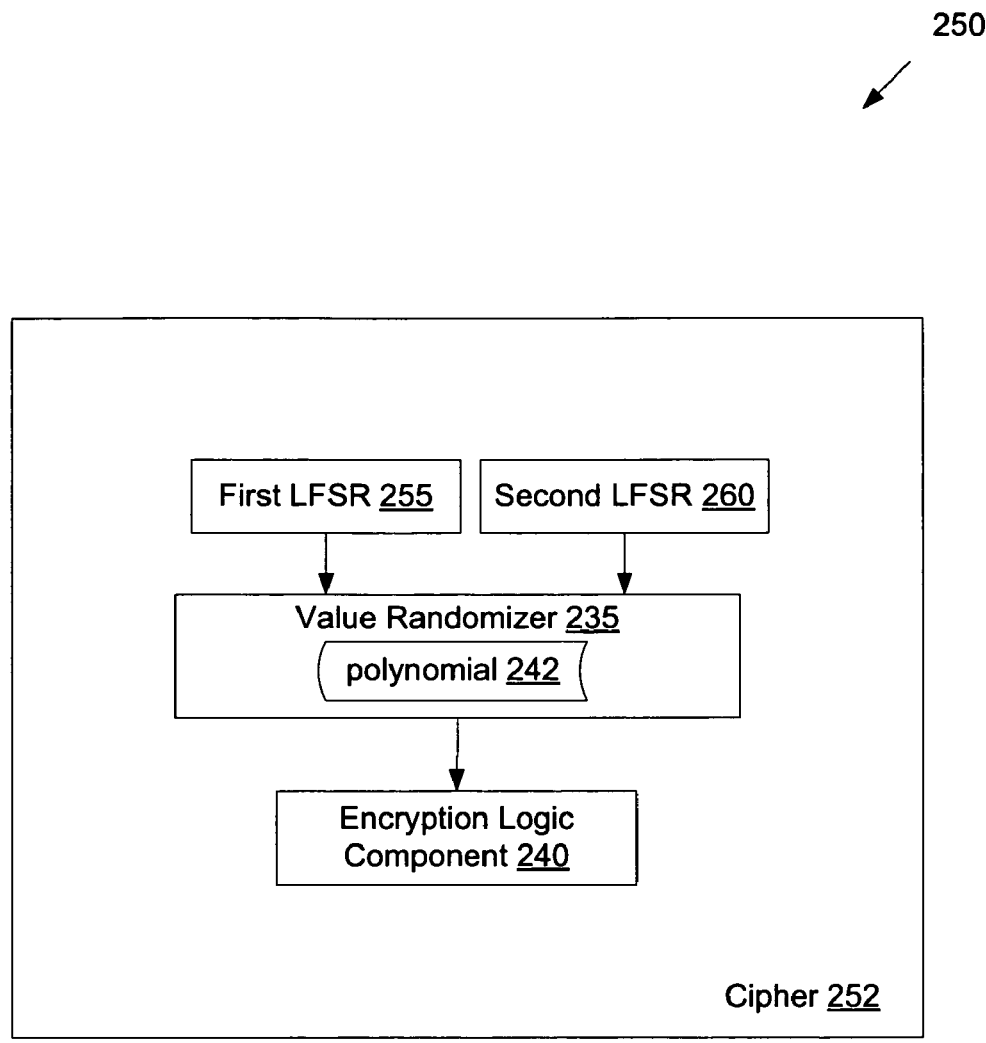
FIG. 2B illustrates an encryption system, in accordance with another embodiment of the present invention.

FIG. 2B illustrates an exemplary cipher 252 in which the first pseudorandom bit source is a first LFSR 255 and the second pseudorandom bit source is a second LFSR 260, in accordance with another embodiment of the present invention. A shift register is an array of single bit memory elements, each of which has a state that can be changed to the state of the preceding bit memory element. The state of the first bit memory element in a shift register is determined based on external input. For example, a four bit shift register with the state 0010 (ordered from left to right as "newest" to "oldest" bits) will transition to 0001 if the external input is 0 or 1001 if the external input is 1.

A linear feedback shift register (LFSR) is a shift register whose input bit is a linear function (called the feedback function) of its previous state. The linear function can be computed by performing exclusive OR (XOR) calculations between bits in the LFSR. Those bits that are combined by the XOR operation are called taps. The linear function of a LFSR is deterministic. Therefore, given a current state of a LFSR with a known feedback function, the next states and previous states will always be the same, and can be predicted with 100% accuracy. A LFSR can be constructed in a Fibonacci configuration, in which XOR gates are fed sequentially into one another (e.g., the XOR gates are external to the shift register). A LFSR can also be constructed in a Galois configuration, in which XOR gates feed into different registers (bit memory elements) within the LFSR and are not sequential (e.g., the XOR gates are within the shift register). LFSRs of either configuration can be used with the present invention. However, illustrated examples included herein only show LFSRs in the Fibonacci configuration.

In one embodiment, each of the first LFSR 255 and the second LFSR 260 has a feedback function that is defined by a primitive polynomial. A polynomial can define a feedback function by identifying the registers to use as taps for a particular LFSR. Each term of the polynomial identifies a single tap (except for the highest degree term or the lowest degree term, which can represent the register that receives the external input). For example, the polynomial $x^4+x^3+1$ (represented as 11001 in a binary string) can identify taps at the first register (from the 1 term) and fourth register (from the $x^3$ term) of a four bit LFSR, with the input at the fourth register (from the $x^4$ term). Feedback functions that are defined by primitive polynomials provide a maximum possible number of states for a shift register before any states are repeated. A LFSR that has a maximum possible number of states is called a maximal LFSR, and is useful in cryptography. A maximal LFSR that is n bits long has $2^n-1$ permissible states and therefore has a cycle length of $2^n-1$. In one embodiment, the cipher 252 has a cycle length that is equal to the least common multiple of the cycle lengths of each LFSR. In a further embodiment, the maximum number of states of the illustrated cipher 252 is equal to $(2^n-1)(2^m-1)$, where n is the size of the first LFSR 255 and m is the size of the second LFSR 260, and where n and m are coprime.

In one embodiment, the primitive polynomial that defines the feedback function associated with first LFSR 255 is a polynomial of degree a, and the primitive polynomial that defines the feedback function associated with second LFSR 260 is a polynomial of degree b. In a further embodiment, the polynomial of degree a is of a different degree than the polynomial of degree b. Alternatively, the polynomial of degree a may have the same degree as the polynomial of degree b. In still a further embodiment, the degree a is coprime with the degree b (the degree a and the degree b do not share a common divisor greater than one). For example, a degree of 16 is coprime with a degree of 17.

Because LFSRs are deterministic, it is important that their initial value (called the seed or initialization vector) be a value that cannot be easily determined. Before the first LFSR 255 and second LFSR 260 can be used to generate pseudorandom bit streams, they should each be initialized. Initialization causes the LFSR to have a unique initial state that is difficult for a cryptanalyst to determine. In one embodiment, initialization includes a preinitialization phase, in which the LFSR is populated with values, and an initialization phase, in which keying information is added to the LFSR.

In the preinitialization phase, some or all of the first LFSR 255 and the second LFSR 260 can be filled with an essentially random bit string, and the rest of the first LFSR 255 and the second LFSR 260 can be filled with a fixed value or fixed values. The essentially random bit string may be, for example, a k-distributed value such as ln 2, $\pi$, 1/e, etc.

In one embodiment, in a software implementation of an LFSR, a buffer (not shown) is used to contain the state of the LFSR. In a further embodiment, the buffer is used as a virtual LFSR. The buffer may have a size that is equal to or greater than the LFSR. If the buffer is longer than the LFSR that is being emulated, the register can be emulated by stepping through the buffer, and placing the results into the buffer just ahead of the current end of the virtual LFSR. This can result in a bit stream that is equivalent to the LFSR being emulated. For example, a four bit LFSR with a feedback function defined by the polynomial $x^4+x+1$ and having the state 0011 would generate an output of 1. This output would typically occupy the input bit of the LFSR, and the rest of the bits would be populated by the values of the preceding bits, as follows: $0011 \rightarrow 1001$.

However, if the LFSR is a virtual LFSR implemented in a 5 bit buffer, the output bit would be placed in the next open bit, as follows $0011x \rightarrow 00111$. The last four bits of the buffer would then represent the current state of the LFSR. Once the last bit in the buffer represents the last bit of the LFSR, the LFSR is aligned with the buffer.

A portion of the buffer that represents the virtual LFSR may be populated with random values, and another portion of the buffer may be assigned fixed values. In one embodiment, at least one of the last q bits of the buffer has a fixed value of 1, where q is the length of the virtual LFSR. In an alternative embodiment, at least one of the first q bits of the buffer has a fixed value of 1. In one embodiment the LFSR has a size q and the buffer has a size b that is at least twice the size of the LFSR (b>=2q). The first b−q bits of the buffer can be filled with the essentially random bit string, the last q−1 bits can be filled with zeros, and the remaining bit can be set to 1. For example, using a 4 bit LFSR whose feedback function is defined by the polynomial $x^4+x+1$ with a buffer length of 12, and using the recurring string 0011001100110011 as the essentially random bit string, the buffer would be preinitialized to contain 0110 0110 1000.

In another embodiment, in which the LFSR is implemented in a buffer, the LFSR has a size q and the buffer has a size b that is one bit larger than q. The last bit of the buffer is fixed at 1. The remaining bits are filled with an essentially random bit string, as described above. For example, the preinitialized state of an 8 bit buffer that represents a 7 bit LFSR might be 01100111. The fixed bits in the buffer can prevent the LFSR from entering a degenerate state (in which all the values are zero and all future values will be zero).

In the initialization phase, the preinitialized state of the LFSR is combined with keying information to generate an initialized state (also known as a keyed state). The combination may be performed by using the XOR function, using polynomial multiplication, etc. In one embodiment, the keying information is XORed sequentially into the preinitialized state of the LFSR. If the LFSR has more bits than the keying information, then some or all of the key bits (bits of the keying information) can be applied to the LFSR multiple times. In one embodiment, once all of the key bits have been combined with bits of the LFSR, the key bits are rotated before combining them with remaining bits of the LFSR. This reduces any patterns that might be detected by a cryptanalyst. In one embodiment, in which a buffer with one or more fixed bits is used, the keying information is not combined with the fixed bits of the buffer (e.g., no keying information is combined with the 1000 of the 0110 0110 1000 preinitialized state in the example above).

In one embodiment, in a software implementation of the LFSR, the key bits are XORed into the first b−q bits of the buffer that contains the LFSR. If all of the key bits are used, then the bits of the keying information are rotated by a number of bits coprime with (b−q) and the length k of the key. The new first bit of the key can then be XORed into the buffer at its next bit position, and so on. This rotation can provide a minimum of alignment between different buffers. For example, continuing the example above with the preinitialized buffer of 0110 0110 1000, assume a 6 bit key 100101 is to be used for initialization, and that the fixed bits of the buffer will not be combined with the keying information. After combining the key with the first 6 bits of the preinitialized state, the key would be rotated by a value coprime with (b−q) and k, which in this example is 1 or 5. Rotating the key by one bit to the left yields 001011. Therefore, the remaining 2 bits of the initialized state are combined with 00 (the first 2 bits of the rotated key). The resultant combined state of the LFSR is 1111 0010 1000.

In one embodiment, once the key bits have been combined into the buffer, the LFSR is clocked a number of times to align the beginning of the virtual LFSR with the beginning of the buffer. In a further embodiment, such alignment is attained by clocking the LFSR b−q times, skipping the fixed bit having the value of 1, and clocking the LFSR an additional q−1 times. (e.g., XORing the result into the resulting bit position). Continuing the above example, the virtual LFSR is initially aligned with the left of the buffer (which has a value of 1111 0010 1000), with the portions of the buffer that do not represent the current state of the buffer being xed out to provide 1111 xxxx xxxx. Clocking the LFSR a single time moves the virtual LFSR one position to the right in the buffer, providing 1111 0010 1000, where the virtual LFSR has the value x111 1xxx xxxx. Clocking the LFSR three more times yields 1111 0011 1000, where the LFSR is xxxx 0011 xxxx. Skipping the next bit position, which in this example is fixed, and clocking an additional 3 times yields 1111 1101 1110, where the LFSR occupies the last four bits as xxxx xxxx 1110. In one embodiment, the last q bits of the buffer are the initialized (keyed) state of the LFSR. This initialized state may be securely stored so that it can later be used to decrypt encrypted data and/or encrypt additional data.

In another embodiment, in a software implementation of the LFSR in which the buffer has a size that is at least one bit longer than the LFSR, the keying information is combined with all but the last bit of the buffer. In a further embodiment, all LFSRs have buffers that are equally sized, regardless of the size of the LFSRs. Therefore, for example, a 6 bit LFSR and a 7 bit LFSR may each have an 8 bit buffer. In still a further embodiment, all buffers that include virtual LFSRs may have a length that is an even multiple of a byte or word (e.g., 8 bits in an x86 operating system). As described above, the key is rotated where there are more bits in the buffer than in the key. For example, XORing 7 key bits of 1001010 into the preinitialized state of 0110 0111 yields 1111 0011. The combined buffer may then be clocked up to b−q−1 times to align the beginning of the virtual LFSR with the beginning of the buffer, which yields 1111 0011. The initialized (keyed) LFSR would then have a state of 0011.

The above described initialization techniques represent algorithms that can be used to initialize the first LFSR 255 and the second LFSR 260 in accordance with certain embodiments of the present invention. It should be understood, however, that numerous other methods and techniques of initialization may be used. For example, those initialization techniques that are used for well known stream ciphers such as RC4, A5/1, FISH, Phelix, MUGI, etc. may be used in embodiments of the present invention.

Additional key state information can be mixed with the state of the first LFSR 255 and the second LFSR 260 after they have been initialized. Such additional key state information may be added immediately after initialization, or after the LFSRs have been clocked one or more times. In one embodiment, additional key state information is added to an LFSR by creating a temporary buffer that includes at least q+k+1 bits, where q is the length of the LFSR and k is the length of the key. The current state of the LFSR can be copied into the first q bits of the buffer, the key can be copied into the remaining bits of the buffer, and at least one of the last q bits of the buffer can be assigned a fixed state of 1. If the key has fewer bits than there are remaining bit positions in the buffer, the key is rotated as described above before filling additional bit positions. The LFSR contained in the buffer can then be clocked repeatedly until the virtual LFSR is aligned with the beginning of the buffer.

Key state mixing can be used to safely encipher multiple messages using the same initial state (e.g., the same master key). Key state mixing can also be used to create a random-access blocked stream cipher (e.g., as used for disk encryption). In one embodiment, a non-linear substitution is used for a block number (e.g., a cryptographic hash, the multiplicative inverse of over the field $GF(2^n)$, etc.). The result of the substitution can be used as the additional key state. Key state mixing can also be used as a basis for an operating system level pseudo random number generator that has the capability of adding additional randomness to the states of LFSRs as random events are detected (e.g., disk seek times, network latency, intra-keystroke timing, mouse pointer movement, etc.).

After the first LFSR 255 and the second LFSR 260 have been initialized, they can each provide a pseudorandom bit stream to value randomizer 235. The first LFSR 255 and second LFSR 260 can be clocked continuously, and after each clock cycle they can each provide a new bit value or a new bit sequence of the pseudorandom bit stream. In one embodiment, the first LFSR 255 and the second LFSR 260 are clocked using the same timing signal. Alternatively, the first LFSR 255 and the second LFSR 260 may be clocked according to different timing signals. The rate at which the first LFSR 255 and the second LFSR 260 are clocked may be fixed or variable. In one embodiment, a result of polynomial multiplication between a bit sequence of the first LFSR 255 and a bit sequence of the second LFSR 260 is used to vary the rate at which the LFSRs are clocked. For example, a subset of the bit sequence that results from such polynomial multiplication may be combined and interpreted as an integer. That integer may then be used as a count for additional clocking (e.g., may provide an additional timing signal).

Returning to FIG. 2A, value randomizer 235 combines the bit stream (e.g., the bit sequences) of the first pseudorandom bit source 225 (e.g., a first LFSR) and the bit stream (e.g., the bit sequences) of the second pseudorandom bit source 230 (e.g., a second LFSR) in a non-linear fashion to generate and output a further randomized pseudorandom bit stream. In one embodiment, the value randomizer 235 combines bit sequences of the first pseudorandom bit source 225 and bit sequences of the second pseudorandom bit source 230 using polynomial multiplication over a finite field of even characteristic (e.g., $GF(2^m)$). In a further embodiment, the finite field is an extension field defined by polynomial 242, which may be a primitive polynomial. Therefore, bit sequences provided by the bit stream of the first pseudorandom bit source 225 and bit sequences provided by the bit stream of the second pseudorandom bit source 230 may be combined using multiplication over a finite field of even characteristic, modulo the polynomial 242. In still a further embodiment, polynomial 242 is a fixed primitive polynomial that generates the field $GF(2^m)$. The fixed primitive polynomial may be a dense polynomial (a polynomial having many terms, e.g., $x^5+x^4+x^2+x+1$) or a sparse polynomial (a polynomial having few terms, e.g., $x^5+x^2+1$). In one embodiment, in which the first pseudorandom bit source is a first LFSR and the second pseudorandom bit source is a second LFSR (e.g., as described with reference to FIG. 2B), the polynomial 242 is a primitive polynomial that has an order that is less than or equal to the order of the first polynomial that defines the feedback function of the first LFSR and the second polynomial that defines the feedback function of the second LFSR. In a further embodiment, polynomial 242 has a degree that is equal to the smaller of the first LFSR 225 and the second LFSR 230.

In one embodiment, for each new bit sequence, each of the first pseudorandom bit source 225 and the second pseudorandom bit source 230 is clocked some number of times. In one embodiment, they are each clocked the same number of times between each bit sequence. Alternatively, they may be clocked a different number of times between different bit sequences (e.g., clocked once to generate a first bit sequence, then clocked 8 times to generate a second bit sequence, etc.). In one embodiment, each of the first pseudorandom bit source 225 and the second pseudorandom bit source 230 is clocked once to generate each new bit sequence. In another embodiment, each of the first pseudorandom bit source 225 and the second pseudorandom bit source 230 include an LFSR and is clocked a number of times equal to that LFSR's length to generate a new state for that LFSR. In still another embodiment, the first pseudorandom bit source 225 and the second pseudorandom bit source 230 are each clocked a number of times equal to the length of the largest LFSR (e.g., if one LFSR is 16 bits long and another is 17 bits long, each may be clocked 17 times) or of the smallest LFSR. Alternatively, the first pseudorandom bit source 225 and the second pseudorandom bit source 230 may each be clocked a number of times that is equal to the degree of polynomial 242.

Once a new state (e.g., bit sequence) of each pseudorandom bit source (e.g., each LFSR) has been generated, value randomizer 235 can perform polynomial multiplication to generate a new bit sequence. In one embodiment, each bit sequence has a length that is equal to the degree of the polynomial 242. If a pseudorandom bit source has a length that is greater than the degree of the polynomial 242, then some portion (e.g., bits) of the pseudorandom bit source may not be included in the polynomial multiplication. For example, assume that the first pseudorandom bit source 225 is a 7 bit LFSR having a state of 1001 001, the second pseudorandom bit source 230 is an 8 bit LFSR having a state of 00010010, and the polynomial 242 is a primitive polynomial $x^5+x^2+1$ (represented as 100101 in a binary string). In such an instance, the last five bits of each LFSR may be used, and the value randomizer 235 could generate a bit sequence as follows:

$$(01001 \otimes 10010 \bmod 100101) = 01011$$

The first pseudorandom bit source 225 and second pseudorandom bit source 230 can then be clocked one or more times to generate new states (bit sequences). The value randomizer 235 may then multiply these new states together to generate a new bit sequence. In one embodiment, value randomizer 235 sends a stream of pseudorandom bit sequences to encryption logic component 240. Alternatively, value randomizer 235 may send a predefined number of pseudorandom bit sequences (e.g., 1, 3, 10, etc.) to encryption logic component 240.

In some cases a subset of the bits of one or both of the first pseudorandom bit source 225 and the second pseudorandom bit source 230 that are multiplied against one another may have a state that includes only zeros. For example, if the second pseudorandom bit source includes an LFSR that has a state of 1000 and the last three bits of the pseudorandom bit sources are being multiplied over $GF(2^3)$, modulo $x^3+x^2+1$, the used bits of the pseudorandom bit sources will have an all zero bit string. If this occurs, in one embodiment the pseudorandom bit source that includes only zeros (e.g., the second LFSR) is clocked an additional predefined number of times (e.g., one additional time) to achieve a nonzero state. This can reduce any bias that might be added to the cipher if the all zero bit strings were used. In one embodiment, one of the pseudorandom bit sources is permitted to have all zero bit strings. Such a pseudorandom bit source would not be clocked any additional times if the all zero bit string is obtained. For example, if the pseudorandom bit source in the preceding example was designated as being permitted to have all zero bit strings, the all zero bit string would be multiplied with a bit string of the first pseudorandom bit source (which could not be the all zero bit string because the first pseudorandom bit source is not designated as being permitted to have the all zero bit string). In one embodiment, in which one of the pseudorandom bit sources is an LFSR that has a length that is equal to the degree of polynomial 242, the all zero bit sequence will never occur for that pseudorandom bit source.

Encryption logic component 240 receives pseudorandom bit sequences from value randomizer 235 and plaintext or ciphertext from message source 205. In one embodiment, encryption logic component 240 is configured as a component of a stream cipher, and performs an invertible operation on the plaintext or ciphertext using the received pseudorandom bit sequences. In one embodiment, the invertible operation is an XOR operation. Alternatively, the invertible operation may include multiplication over a finite field of even characteristic, or some other mathematical operation that intermingles the received bit sequences with the plaintext or ciphertext.

In one embodiment, all of the bits of the received bit sequences are combined with received plaintext or ciphertext. Alternatively, only some of the bits in the received bit sequences may be combined with the plaintext or ciphertext. For example, every other bit of the received bit sequence may be combined with the received plaintext or ciphertext, or the last half of the bits in the bit sequence may be combined with the received plaintext or ciphertext.

In one embodiment, encryption logic component 240 rearranges the bits of the received bit sequences according to a permutation operation before performing the invertible operation. Alternatively, encryption logic component 240 may combine some of the bits of the received bit sequence with other bits of the received bit sequence (e.g., using an XOR operation), and then combine the result with the received plaintext or ciphertext. These additional operations may increase the difficulty of deciphering ciphertext without a key.

In an example, assume that encryption logic component 240 receives a 16 bit sequence 0111 0001 0101 1111 from value randomizer 235, and plaintext of 0110 0001 (binary representation of the ASCII coding for the letter 'a') from message source 205. Encryption logic component 240 may apply an XOR operation that combines the 5th through 8th bits (0001) and the 13th through 16th bits (1111) with the plaintext (0110 0001) to generate ciphertext as follows:

$01100001 \oplus 00011111 = 01111110$

To decipher the ciphertext and reproduce the plaintext, the ciphertext may be combined with the same pseudorandom bit sequence 0001 1111.

In one embodiment, encryption logic component 240 is configured as a component of a block cipher. Encryption logic component 240 may receive a preset number of pseudorandom bit sequences from value randomizer 235. These pseudorandom bit sequences may then be used as sub-keys for the block cipher. The block cipher may then encrypt or decrypt data according to block cipher algorithms such as DES, AES, IDEA, etc.

Cipher 215 can transmit or otherwise provide ciphertext or plaintext to message destination 220. In one embodiment, cipher 215 provides the ciphertext or plaintext to the message destination 220 as each bit or each block of ciphertext or plaintext is generated. Alternatively, cipher 215 may wait until an entire message (e.g., including multiple blocks and/or bits), or some portion of the entire message, has been encrypted or decrypted before providing that message (or portion of the message) to message destination 220. Message destination 220 may be an application, user, file system, database, etc.

Figure 3A:
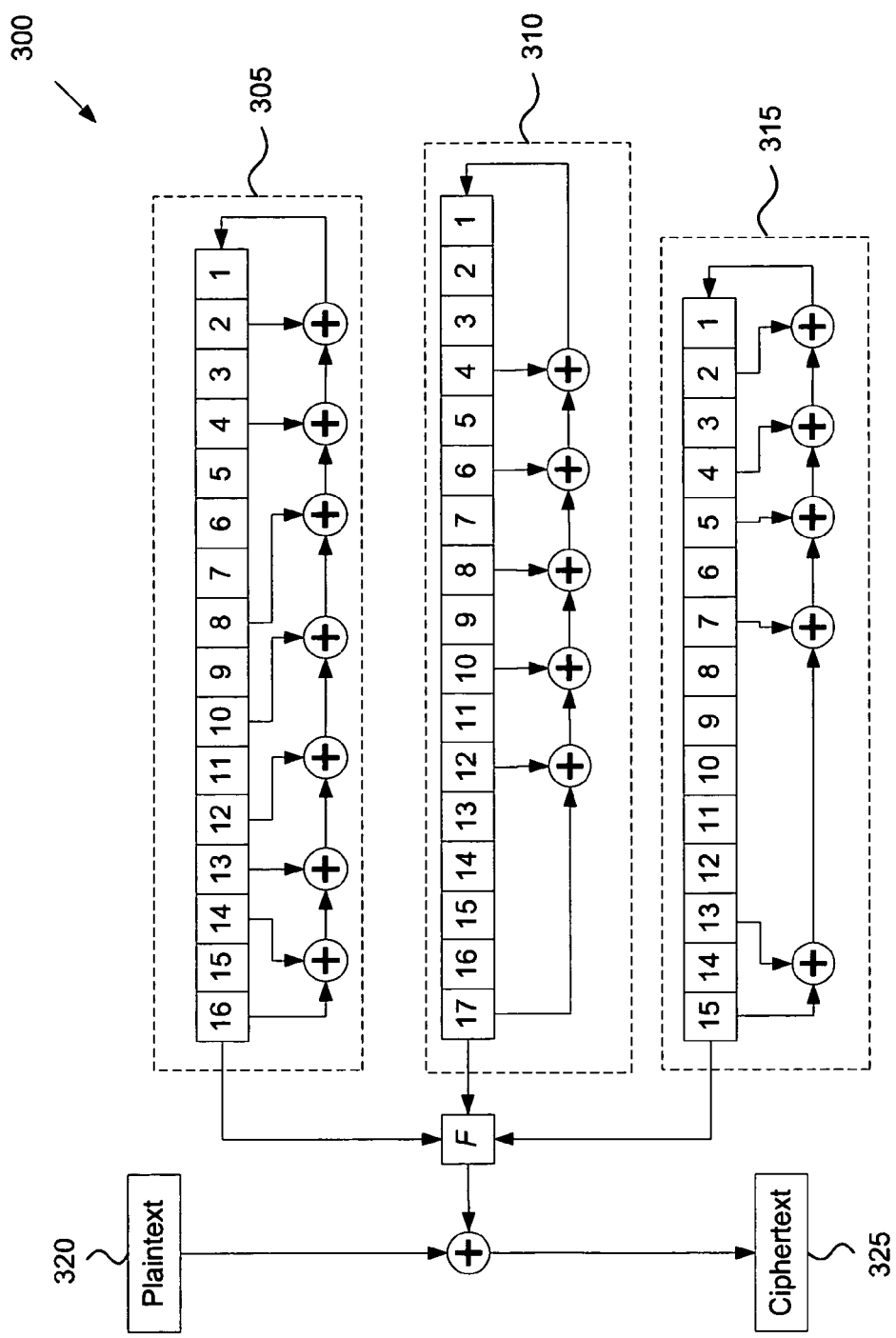
FIG. 3A illustrates an exemplary stream cipher, in accordance with one embodiment of the present invention.

FIG. 3A illustrates an exemplary stream cipher 300, in accordance with one embodiment of the present invention. The exemplary stream cipher 300 includes a first LFSR 305, a second LFSR 310 and a third LFSR 315. Each LFSR includes a number of registers, numbered 1 through 17, and includes taps at some of the bits based on the primitive polynomial that defines the feedback function for that LFSR. In the illustrated embodiment, the first bit of each LFSR is the input, and the highest bit in the register is the output. The first LFSR 305 is a 16 bit shift register and has a feedback function that is defined by the primitive polynomial $x^{16}+x^{14}+x^{13}+x^{12}+x^{10}+x^8+x^4+x^2+1$. The second LFSR 310 is a 17 bit shift register and has a feedback function that is defined by the primitive polynomial $x^{17}+x^{12}+x^{10}+x^8+x^6+x^4+1$. The third LFSR 315 is a 15 bit shift register and has a feedback function that is defined by the primitive polynomial $x^{15}+x^{13}+x^{17}+x^5+x^4+x^2+1$.

A mixing function F performs polynomial multiplication between bit sequences output by the first LFSR 305, the second LFSR 310 and the third LFSR 315. In one embodiment, the mixing function F receives values for a single bit at a time (e.g., in a bit stream) from each of the LFSRs, and stores the bit values in a buffer until a predetermined number of bit values are received from each LFSR (e.g., a number of bits equal to the degree of the primitive polynomial used by the mixing function). The stored bit sequences may then be multiplied with each other.

In one embodiment, the mixing function F combines the bit sequences using multiplication over a finite field of even characteristic, modulo a fixed primitive polynomial. In a further embodiment, the fixed primitive polynomial generates the field $GF(2^m)$. In one embodiment, the fixed primitive polynomial has a degree that is equal to the smallest LFSR (e.g., a degree of 15). In another embodiment, the fixed primitive polynomial has a degree that is pairwise coprime with the degree of the polynomial of the first LFSR 305, the degree of the polynomial of the second LFSR 310 and the degree of the polynomial of the third LFSR 315. For example, the fixed primitive polynomial may have a degree of 13. The mixing function F outputs a pseudorandom bit stream that is combined with plaintext 320 by an XOR operator to generate ciphertext 325.

Figure 3B:
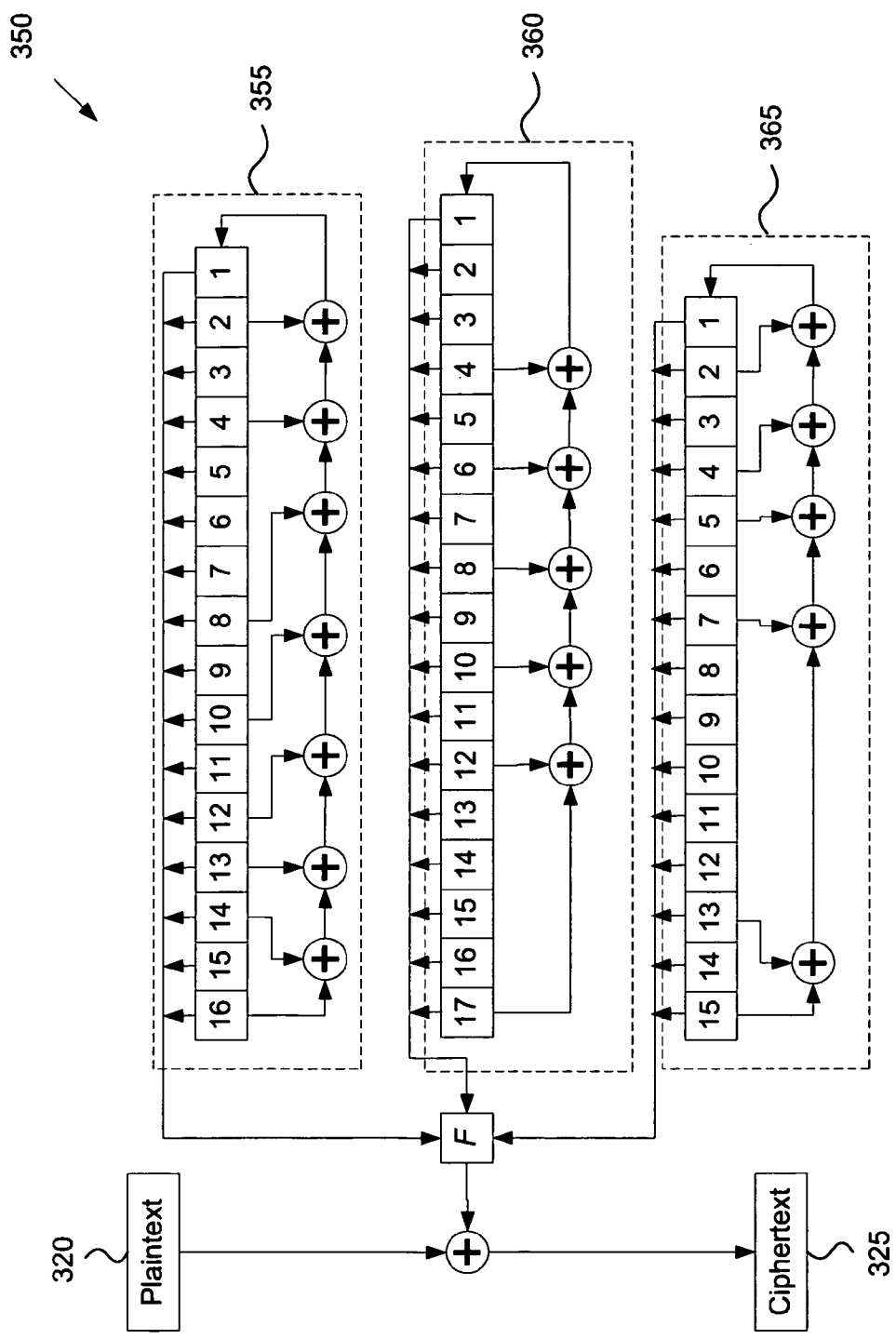
FIG. 3B illustrates an exemplary stream cipher, in accordance with another embodiment of the present invention.

FIG. 3B illustrates an exemplary stream cipher 350, in accordance with another embodiment of the present invention. The exemplary stream cipher 350 includes a first LFSR 355, a second LFSR 360 and a third LFSR 365. Each LFSR includes a number of registers, numbered 1 through 17, and includes taps at some of the bits based on the primitive polynomial that defines the feedback function for that LFSR. In the illustrated embodiment, the first bit of each LFSR is the input, and each bit in the register is an output to mixing function F. The first LFSR 305 is a 16 bit shift register and has a feedback function that is defined by the primitive polynomial $x^{16}+x^{14}+x^{13}+x^{12}+x^{10}+x^8+x^4+x^2+1$. The second LFSR 310 is a 17 bit shift register and has a feedback function that is defined by the primitive polynomial $x^{17}+x^{12}+x^{10}+x^8+x^6+x^4+1$. The third LFSR 315 is a 15 bit shift register and has a feedback function that is defined by the primitive polynomial $x^{15}+x^{13}+x^{17}+x^5+x^4+x^2+1$.

Mixing function F performs polynomial multiplication between bit sequences output by the first LFSR 355, the second LFSR 360 and the third LFSR 365. Mixing function F receives a stream of bit sequences from the LFSRs, each bit stream including a bit value for each bit of the LFSR. In one embodiment, the mixing function F combines the bit sequences using multiplication over a finite field of even characteristic, modulo a fixed primitive polynomial. In a further embodiment, the fixed primitive polynomial generates the field $GF(2^m)$. The mixing function F outputs a pseudorandom bit stream that is combined with plaintext 320 by an XOR operator to generate ciphertext 325.

Figure 4A:
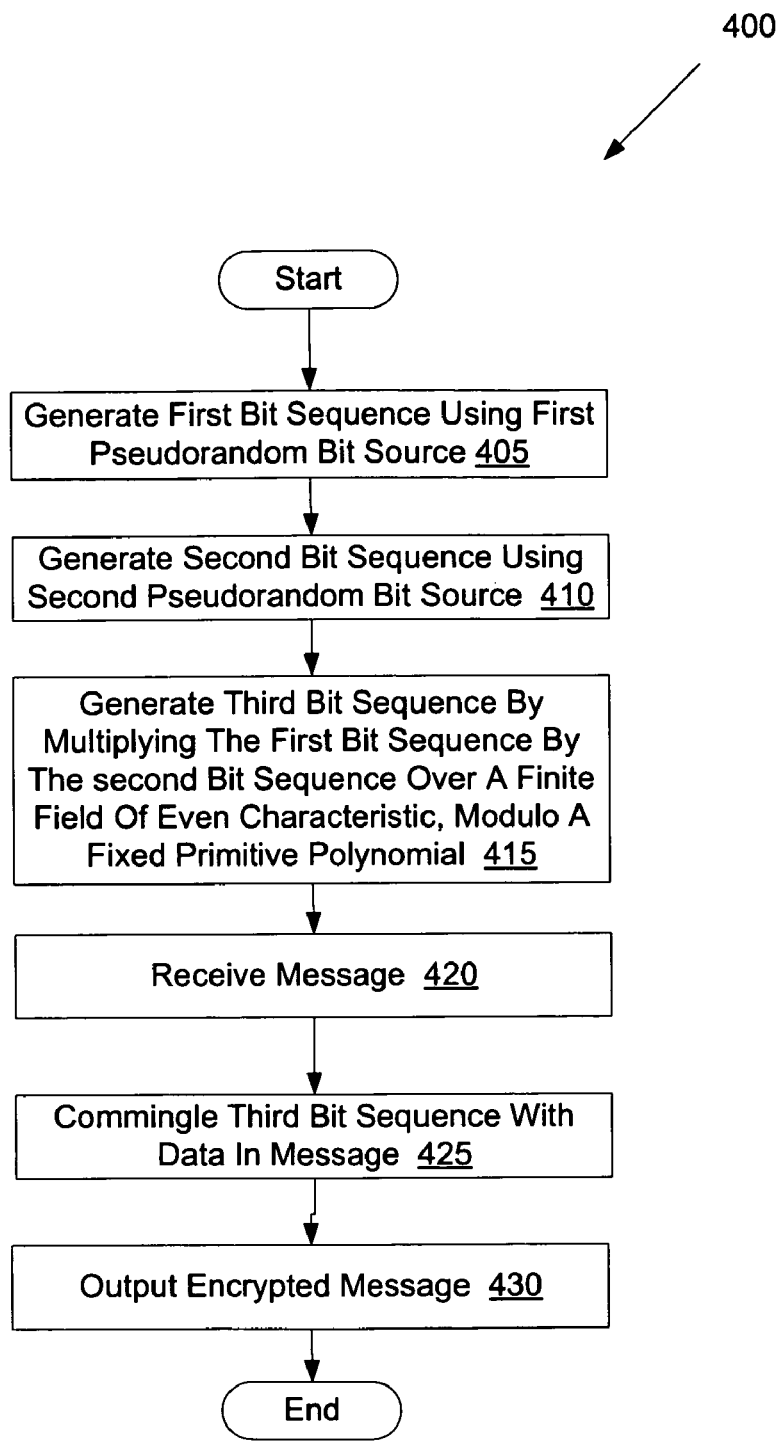
FIG. 4A illustrates a flow diagram of one embodiment for a method of encrypting data.

FIG. 4A illustrates a flow diagram of one embodiment for a method 400 of encrypting data. The method may be performed by processing logic that may comprise hardware (e.g., circuitry, dedicated logic, programmable logic, microcode, etc.), software (such as instructions run on a processing device), or a combination thereof. In one embodiment, method 400 is performed by cipher 215 of FIG. 2A.

Referring to FIG. 4A, method 400 includes generating a first bit sequence using a first pseudorandom bit source (block 405). At block 410, a second bit sequence is generated using a second pseudorandom bit source. The first pseudorandom bit source and second pseudorandom bit source may each include an LFSR, a stream cipher, a block cipher running in cipher feedback mode, etc. The first pseudorandom bit source and second pseudorandom bit source may include the same or different pseudorandom value generators.

At block 415, a third bit sequence is generated by multiplying the first bit sequence with the second bit sequence over a finite field of even characteristic, modulo a fixed primitive polynomial. In one embodiment, the fixed primitive polynomial has a degree of y and generates the extension field $GF(2^y)$.

At block 420, a message is received from a message source. The message source may be an input device, an application (e.g., a mail application), a file system or database, a region of memory, or some other source. The message may include a distributed transaction message, an electronic mail message, data stored in a region of memory, data to be written to a region of memory, etc.

At block 425, the third bit sequence is commingled with data. The data may be plaintext data or ciphertext data. In one embodiment, the third bit sequence includes one or more sub-keys that are combined with data by a block cipher. In another embodiment, the third bit sequence is part of a pseudorandom bit stream that is combined with data by a stream cipher. At block 430, an encrypted message is output.

Though method 400 has been described with reference to two pseudorandom bit sources, the techniques described can equally be applied to ciphers that include more than two pseudorandom bit sources.

Figure 4B:
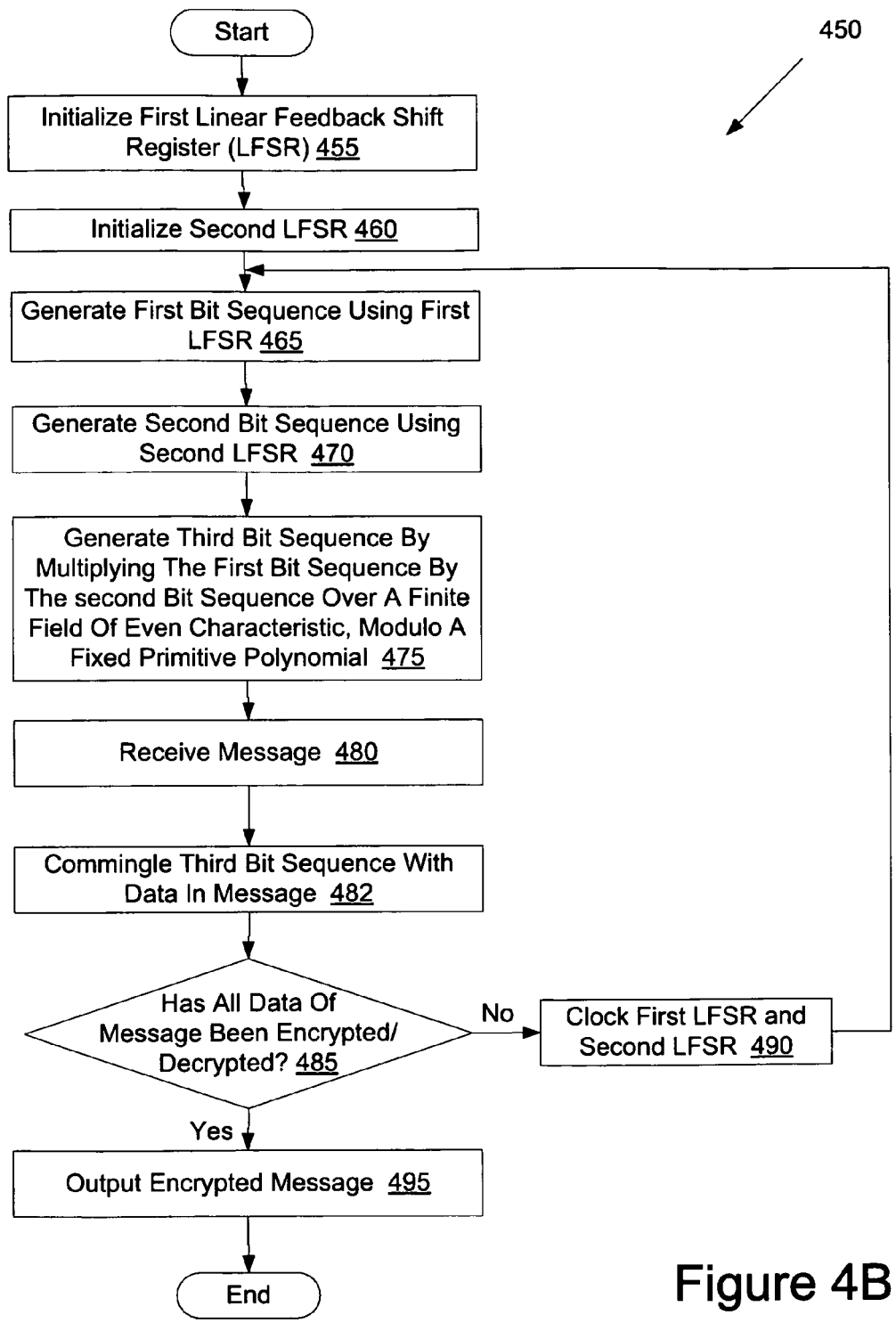
FIG. 4B illustrates a flow diagram of another embodiment for a method of encrypting data.

FIG. 4B illustrates a flow diagram of another embodiment for a method 450 of encrypting data. The method may be performed by processing logic that may include hardware (e.g., circuitry, dedicated logic, programmable logic, microcode, etc.), software (such as instructions run on a processing device), or a combination thereof. In one embodiment, method 450 is performed by cipher 252 of FIG. 2B.

Referring to FIG. 4B, method 450 includes initializing a first linear feedback shift register (LFSR) at block 455, and initializing a second LFSR at block 460. For each of the first LFSR and the second LFSR, initialization may include filling the LFSR with values to preinitialize the LFSR. Initialization may also include adding keying information to the LFSRs to generate an initial value. This initial value can be stored, and later used to decipher encrypted data. The initial value can also be used later to encipher other bit streams.

At block 465, a first bit sequence is generated using the first LFSR. In one embodiment, the first LFSR has a first feedback function that is defined by a first primitive polynomial. In a further embodiment, the first primitive polynomial has a degree m and generates the extension field $GF(2^m)$, where m is an integer greater than or equal to one.

At block 470, a second bit sequence is generated using the second LFSR. In one embodiment, the second LFSR has a second feedback function that is defined by a second primitive polynomial. In a further embodiment, the second primitive polynomial has a degree n and generates the extension field $GF(2^n)$, where n is an integer greater than or equal to one. In one embodiment, the degree m of the first polynomial is coprime with the degree n of the second polynomial.

At block 475, a third bit sequence is generated by multiplying the first bit sequence with the second bit sequence over a finite field of even characteristic, modulo a third primitive polynomial. In one embodiment, the fixed primitive polynomial has a degree of y and generates the extension field $GF(2^y)$. In a further embodiment, the third primitive polynomial has a degree that is equal to the smaller of the first LFSR and the second LFSR. In another embodiment, the third primitive polynomial has a degree that is pair wise coprime with the degree of the polynomial of the first LFSR and the degree of the polynomial of the second LFSR.

At block 480, a message is received from a message source. The message source may be an input device, an application (e.g., a mail application), a file system or database, a region of memory, or some other source. The message may include a distributed transaction message, an electronic mail message, data stored in a region of memory, data to be written to a region of memory, etc.

At block 482, the third bit sequence is commingled with data. The data may be plaintext data or ciphertext data. In one embodiment, the third bit sequence includes one or more sub-keys that are combined with data by a block cipher. In another embodiment, the third bit sequence is part of a pseudorandom bit stream that is combined with data by a stream cipher.

At block 485, processing logic determines whether all data of a message has been encrypted or decrypted and/or whether additional sub-keys are needed. If all of the data of the message has been encrypted or decrypted and/or no additional sub-keys are needed, then the method proceeds to block 495 and an encrypted message may be output. The encrypted message may be stored in a storage device or transmitted to a remote message destination. If not all data of the message has been encrypted or decrypted and/or additional sub-keys are needed, the method proceeds to block 490.

A block 490 the first LFSR and the second LFSR are each clocked to generate new bit sequences. In one embodiment, the first LFSR and second LFSR are each clocked once. Alternatively, the first LFSR and second LFSR may each be clocked multiples times. Moreover, the first LFSR and second LFSR may each be clocked the same number of times or a different number of times. The method then returns to block 415.

Though method 450 has been described with reference to two linear feedback shift registers, the techniques described can equally be applied to ciphers that include more than two linear feedback shift registers.

Figure 5:
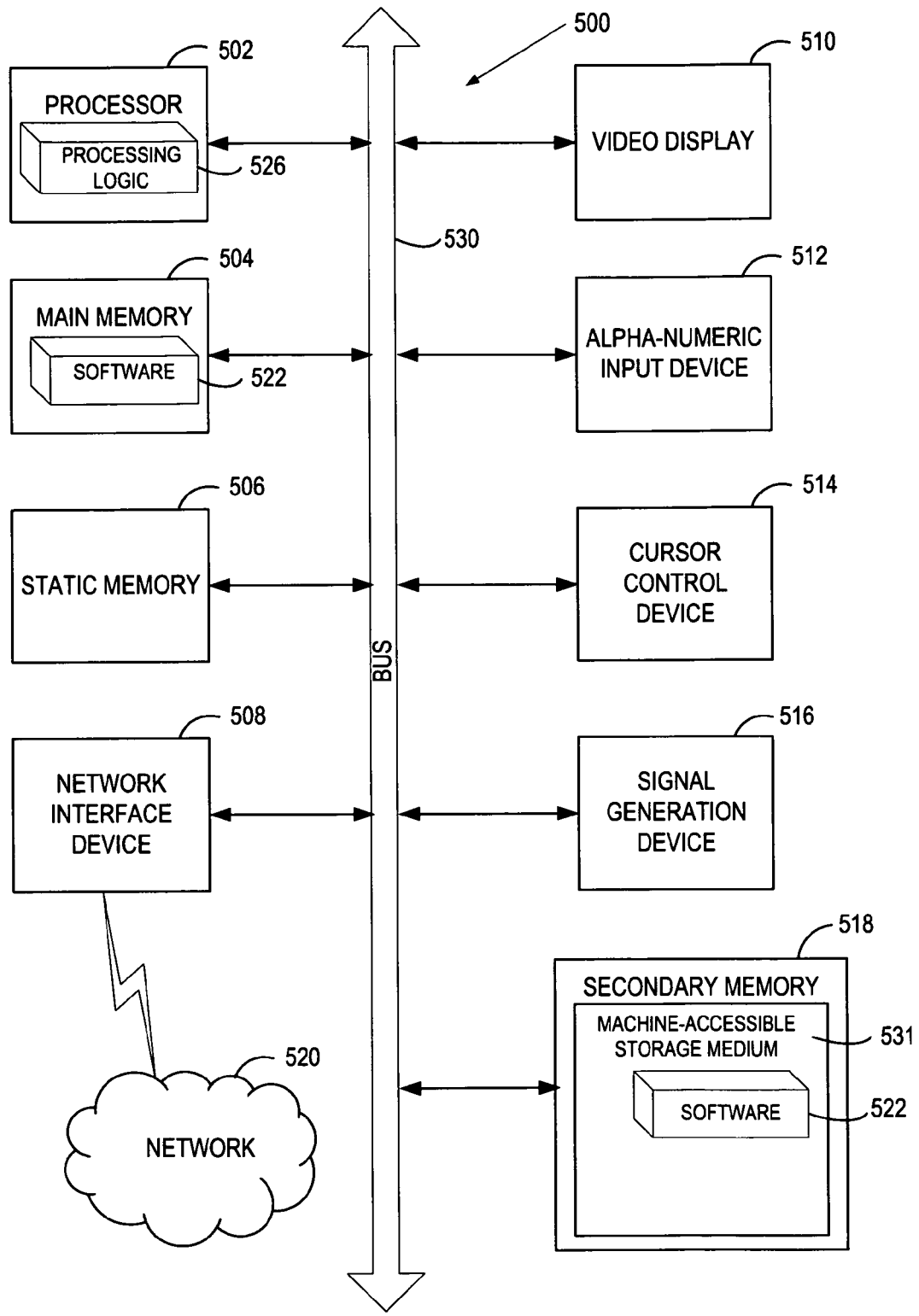
FIG. 5 illustrates a block diagram of an exemplary computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. For example, the machine-readable storage medium 531 may store the cipher 215 of FIG. 2, and/or a software library containing methods that call the cipher 215. The stored cipher, when executed by processor 502, may encrypt some (e.g., specified regions) or all of the main memory 504 and/or secondary memory 518. The cipher may also encrypt messages generated by processes being run on processor or input received by alphanumeric input device 512 or cursor control device 514, or to decrypt messages received by network interface device 508. The stored software 522 may reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method of securing data, comprising:
    generating, using a computing device, a first bit sequence using a first pseudorandom bit source, wherein the first pseudorandom bit source comprises a first buffer that represents a first virtual linear feedback shift register having a first feedback function defined by a first primitive polynomial, the first buffer having more bits than the first virtual linear feedback shift register, at least one of the bits in the first buffer having a fixed state of 1;
    generating a second bit sequence using a second pseudorandom bit source, wherein the second pseudorandom bit source comprises a second buffer that represents a second virtual linear feedback shift register having a second feedback function defined by a second primitive polynomial, the second buffer having more bits than the second virtual linear feedback shift register, at least one of the bits in the second buffer having a fixed state of 1;

generating a third bit sequence by multiplying the first bit sequence with the second bit sequence over a finite field of even characteristic, modulo a fixed primitive polynomial;

receiving a message from a message source; and commingling the third bit sequence with the message to conceal contents of the message.

2. The method of claim 1, further comprising:
generating one or more additional bit sequences with one or more additional linear feedback shift registers, each of the one or more additional linear feedback shift registers having a distinct feedback function defined by a distinct primitive polynomial; and
generating the third bit sequence by multiplying together the first bit sequence, the second bit sequence and the one or more additional bit sequences over the finite field of even characteristic, modulo the fixed primitive polynomial.

3. The method of claim 1, wherein the first primitive polynomial is a polynomial of degree a, the second primitive polynomial is a polynomial of degree b, and the fixed primitive polynomial is a polynomial of degree c, wherein a, b and c are integers greater than one and none of the degree a or the degree b share a common divisor greater than one.

4. The method of claim 3, wherein the degree c is less than or equal to the degree a and the degree b.

5. The method of claim 1, further comprising:
initializing the first virtual linear feedback shift register by filling the first virtual linear feedback shift register with at least one first fixed bit and a first plurality of random starting bits, and by combining a first key with the first plurality of random starting bits; and
initializing the second virtual linear feedback shift register by filling the second virtual linear feedback shift register with at least one second fixed bit and a second plurality of random starting bits, and by combining one of the first key or a second key with the second plurality of random starting bits.

6. The method of claim 1, further comprising:
clocking the first virtual linear feedback shift register a predetermined number of times if all bits of the first bit sequence have a value of zero.

7. The method of claim 1, further comprising:
using the third bit sequence to generate one or more keys; and
using the one or more keys in a block cipher to encipher the message.

8. The method of claim 1, further comprising:
determining a plurality of bits from the third bit stream to commingle with the message.

9. The method of claim 1, wherein the message is one of a distributed transaction message, an electronic mail message, data stored in a region of memory, or data to be written to a region of memory.

10. An encryption system comprising:
a first buffer that represents a first virtual linear feedback shift register having a first feedback function defined by a first primitive polynomial, the first buffer having more bits than the first virtual linear feedback shift register, at least one of the bits in the first buffer having a fixed state of 1, wherein the first virtual linear feedback shift register acts as a first pseudorandom bit source to generate a first bit sequence;

a second buffer that represents a second virtual linear feedback shift register having a second feedback function defined by a second primitive polynomial, the second buffer having more bits than the second virtual linear feedback shift register, at least one of the bits in the second buffer having a fixed state of 1, wherein the second virtual linear feedback shift register acts as a second pseudorandom bit source to generate a second bit sequence;

a value a processing device executing randomizer to-generate a third bit sequence by multiplying the first bit sequence with the second bit sequence over a finite field of even characteristic, modulo a fixed primitive polynomial; and an encryption logic component to commingle the third bit sequence with a message received from the message source to conceal the message.

11. The encryption system of claim 10, further comprising:
one or more additional linear feedback shift registers, each of the one or more additional linear feedback shift registers having a distinct feedback function defined by a distinct primitive polynomial, and each of the one or more additional linear feedback shift registers to generate one or more additional bit sequences;
the value randomizer to generate the third bit sequence by multiplying together the first bit sequence, the second bit sequence and the one or more additional bit sequences over the finite field of even characteristic, modulo the fixed primitive polynomial.

12. The encryption system of claim 10, wherein the first primitive polynomial is a polynomial of degree a, the second primitive polynomial is a polynomial of degree b, and the fixed primitive polynomial is a polynomial of degree c, wherein a, b and c are integers greater than one and none of the degree a, the degree b or the degree c share a common divisor greater than one.

13. The encryption system of claim 10, wherein
the first virtual linear feedback shift register is initialized by filling the first virtual linear feedback shift register with at least one first fixed bit and a first plurality of random starting bits, and by combining a first key with the first plurality of random starting bits; and
the second virtual linear feedback shift register is initialized by filling the second virtual linear feedback shift register with at least one second fixed bit and a second plurality of random starting bits, and by combining one of the first key or a second key with the second plurality of random starting bits.

14. The encryption system of claim 10, wherein the value randomizer is configured to generate one or more keys from the third bit stream, and wherein the encryption logic component is a block cipher.

15. The encryption system of claim 10, wherein the encryption logic component is configured to determine a plurality of bits from the third bit sequence to commingle with the message.

16. The encryption system of claim 10, wherein the message is one of a distributed transaction message, an electronic mail message, data stored in a region of memory, or data to be written to a region of memory.

17. A non-transitory computer readable storage medium including instructions that, when executed by a processing system, cause the processing system to perform a method comprising:
generating a first bit sequence using a first pseudorandom bit source, wherein the first pseudorandom bit source comprises a first buffer that represents a first virtual linear feedback shift register that has a first feedback function defined by a first primitive polynomial, the first buffer having more bits than the first virtual linear feedback shift register, at least one of the bits in the first buffer having a fixed state of 1;

generating a second bit sequence using a second pseudorandom bit source, wherein the second pseudorandom bit source comprises a second buffer that represents a second virtual linear feedback shift register that has a second feedback function defined by a second primitive polynomial, the second buffer having more bits than the second virtual linear feedback shift register, at least one of the bits in the second buffer having a fixed state of 1;

generating a third bit sequence by multiplying the first bit sequence with the second bit sequence over a finite field of even characteristic, modulo a fixed primitive polynomial;

receiving a message from a message source; and commingling the third bit sequence with the message to conceal contents of the message.

18. The non-transitory computer readable storage medium of claim 17, wherein the first primitive polynomial is a polynomial of degree a, the second primitive polynomial is a polynomial of degree b, and the fixed primitive polynomial is a polynomial of degree c, wherein a, b and c are integers greater than one and none of the degree a or the degree b share a common divisor greater than one.

19. The non-transitory computer readable storage medium of claim 18, wherein the degree c is less than or equal to the degree a and the degree b.

20. The non-transitory computer readable storage medium of claim 17, the method further comprising:

initializing the first virtual linear feedback shift register by filling the first virtual linear feedback shift register with at least one first fixed bit and a first plurality of random starting bits, and by combining a first key with the first plurality of random starting bits; and initializing the second virtual linear feedback shift register by filling the second virtual linear feedback shift register with at least one second fixed bit and a second plurality of random starting bits, and by combining one of the first key or a second key with the second plurality of random starting bits.

21. The non-transitory computer readable storage medium of claim 17, the method further comprising:

using the third bit sequence to generate one or more keys; and using the one or more keys in a block cipher to encipher the message.

22. The non-transitory computer readable storage medium of claim 17, the method further comprising:

determining a plurality of bits from the third bit stream to commingle with the message.

* * * * *